United States Patent Office 3,452,103
Patented June 24, 1969

3,452,103
FLUOROHYDROXY ETHERS
Floyd D. Trischler, San Diego, Calif., assignor to Whittaker Corporation, Los Angeles, Calif., a corporation of California
No Drawing. Filed Dec. 30, 1966, Ser. No. 605,994
Int. Cl. C07c 41/04, 43/28, 41/10
U.S. Cl. 260—615         10 Claims

ABSTRACT OF THE DISCLOSURE

This patent describes the preparation of poly(polyfluoralkylene-glycol) mono (hydroxy polyfluoralkylene) ethers from fluoroalkylene oxides.

---

This invention is concerned with the preparation of the new novel fluorohydroxy ethers.

The polymerization of trifluoropropylene oxide by cationic initiators has been reported previously. Among the initiators used were aluminum chloride, boron trifluoride and ferric chloride. No effort was expended to determine end groups. The polyether failed to react with maleic anhydride; when it was reacted with hexamethylene diisocyanate, the viscosity increased somewhat, but the product was not determined. The efforts of these investigators was summarized as follows: "Previous attempts by other investigators have not been very successful. Such a reaction would be possible only if the polymer molecules were terminated by reactive functional groups. No attempts were made to determine the type of end groups present in the liquid polyethers prepared in this program."

Trifluoropropylene oxide has been polymerized using boron trifluoride as the cationic catalyst. The product contained unsaturated end groups believed to be

$$CF_2=CH-O-$$

Trifluoropropylene oxide was also polymerized with aluminum chloride. The resultant polymer failed to yield a solid elastomer when reacted with a diisocyanate, indicating the polyether was not difunctional. In addition, trifluoropropylene oxide was previously polymerized with potassium hydroxide to obtain 10% polymer. This was recently repeated to yield a 61% of polymer having a molecular weight of 4300. The polymer, however, contained terminal unsaturation believed to be

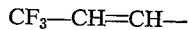
$$CF_3-CH=CH-$$

The polyether prepared by previous investigators using cationic initiators contain end groups which cannot be utilized for chain extension by reaction with acids, acid chlorides, acid anhydrides, esters, isocyanates, etc. The polyether prepared by previous investigators using potassium hydroxide initiation contain end groups in which only one of the end groups will react with acids, acid chlorides, acid anhydrides, esters, isocyanates, etc.

Accordingly, it is a principal object of this invention to provide a novel class of polyethers.

More particularly, it is an object of this invention to provide a novel method for the synthesis of polyethers.

It is also a part of an object of the instant invention to prepare new fluorine-containing polyethers having a plurality of functional terminal groups.

These and other objects and advantages of the present invention will be apparent from the more detailed description which follows.

Briefly, this invention is concerned with the preparation of poly(polyfluoralkylene - glycol)mono(hydroxy polyfluoroalkylene) ethers, unique compositions of matter.

They are prepared by initiating the polymerization of fluoroalkylene oxides with the alkali salt of a polyfluoroalkylene diol:

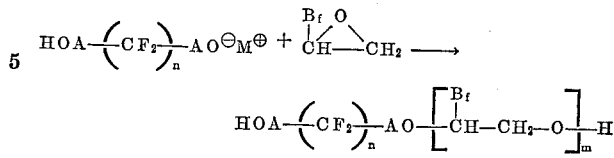

wherein A is alkylene, normally containing from 1 to 5 carbons, B$_f$ is a fluoroalkyl group having from 1 to about 8 carbon atoms, M is an alkali metal such as sodium, potassium and the like, $n$ is an integer from 1 to about 10, and $m$ is an integer from 1 to about 1000. Typically, B$_f$ is monofluoromethyl, perfluoromethyl, perfluorethyl, perfluoroisopropyl, perfluorobutyl, and the like.

The polymer obtained contains two primary alcohol end groups which can be reacted with acids, acid chlorides, acid anhydrides, esters, isocyanates, etc., for chain extension and crosslinking.

The following example is presented solely to illustrate the invention and should not be regarded as limiting in any way. In the example, the parts and percentages are by weight unless otherwise indicated.

EXAMPLE

The sodium salt of hexafluoropentanediol (11.7 g., 0.05 mole), which can be obtained in the manner described in J.A.C.S., Volume 74, page 444 (1952), and trifluoropropylene oxide (45.0 g., 0.30 mole) were heated at 88°–90° C. for 88 hours. The mixture was washed with water, neutralized, dissolved in ether and dried. The ether was removed to yield 41.0 g. (72.3% of polyether) The molecular weight by vapor pressure osmometry was 1000, and the hydroxyl equivalent weight was 500. A polyether (5.9 g., 0.01 mole) prepared as above having a molecular weight of 585, tolyene-2,4-diisocyanate (2.1 g., 0.012 mole) and stannous octoate (2 drops) were mixed and cured 1 hour at 105° C. to yield a solid polymer suitable for use as a coating, adhesive, foam, or laminating resin.

The infrared data, molecular weight and end group analysis verified the identity of this compound.

The polyethers of this invention are usable for further reactions with diacids, diacid chlorides, anhydrides, diesters, diisocyanates, etc., which then can be used for coatings, foams, adhesives, laminates, etc.

The polymers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by a number of advantageous properties including excellent resistance to heat and cold, direct sunlight, oxygen and ozone, oil and solvents. They display unusually outstanding resistance to mechanical abrasion and to deterioration caused by flexing, stretching and the like.

The properties of these polymers may be varied by suitable compounding. The amount and type of compounding agent to be incorporated in the stock is dependent upon the use for which the polymer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well defined colors. Conventional rubber processing machinery such as rubber mills or Werner-Pfieiderer or Banbury mixers may be used.

The resulting compounded stocks may be shaped and cured in conventional equipment used in the rubber industry.

The solutions or dispersed gels prepared from the uncured polymers of this invention may be for forming supported or unsupported films, for laminates, for coating fabrics or solid surfaces, and for forming adhesive bonds between a wide variety of plastics, elastomers, fabrics, metals, wood, leather, ceramics and the like.

Having fully described the invention, it is intended that it be limited to the full scope of the claims.

I claim:

1. A novel polyether having the formula:

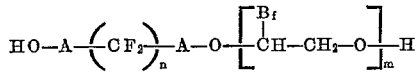

wherein A is alkylene containing up to 5 carbon atoms, $n$ is an integer from 1 to about 10, $B_f$ is a fluoroalkyl group having from 1 to about 8 carbon atoms, and $m$ is an integer from 1 to about 1000.

2. The polyether of claim 1 wherein A is methylene.
3. The polyether of claim 1 wherein $n$ is equal to 3.
4. The polyether of claim 1 wherein $B_f$ is trifluoromethylene.
5. The method of preparing novel polyether having the formula:

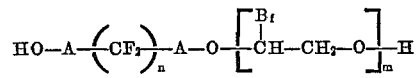

which comprises heat reacting a fluoroalkylene oxide having the formula:

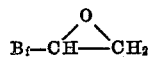

with an alkali salt of a polyfluoroalkylene diol of the formula:

wherein A is an alkylene group containing up to 5 carbon atoms, $B_f$ is a fluoroalkyl group having from 1 to about 8 carbon atoms. M is an alkali metal, $n$ is an integer from 1 to about 10 and $m$ is an integer from 1 to about 1000, neutralizing, and recovering the polyether product.

6. The method of claim 5 wherein A is methylene.
7. The method of claim 5 wherein $B_f$ is trifluoromethylene.
8. The method of claim 5 wherein M is sodium.
9. The method of claim 5 wherein $n$ is equal to 3.
10. The method of preparing a novel polyether which comprises heat reacting the sodium salt of hexafluoropentanediol with trifluoropropylene oxide, neutralizing, and recovering the polyether product.

References Cited

UNITED STATES PATENTS

| | | |
|---|---|---|
| 2,723,999 | 11/1955 | Cowen et al. |
| 3,244,754 | 4/1966 | Bruson et al. |
| 3,318,960 | 5/1967 | Earing. |

FOREIGN PATENTS

| | | |
|---|---|---|
| 528,136 | 7/1956 | Canada. |
| 736,991 | 9/1955 | Great Britain. |

LEON ZITVER, *Primary Examiner.*

H. T. MARS, *Assistant Examiner.*

U.S. Cl. X.R.

260—2, 2.5, 37, 75, 77.5